United States Patent [19]
Fumin

[11] Patent Number: 6,146,170
[45] Date of Patent: Nov. 14, 2000

[54] ADAPTOR FOR USING A PLUG-IN TYPE COMPACT FLUORESCENT LAMP IN AN R7S LAMPHOLDER

[76] Inventor: Guan Fumin, No.11, 2nd Door, 2nd Bldg. No 14 Yu Shan Rd., Qing Dao City, Shan Dong Province, China

[21] Appl. No.: 09/254,457

[22] PCT Filed: Jul. 7, 1998

[86] PCT No.: PCT/US98/14104

§ 371 Date: Dec. 13, 1999

§ 102(e) Date: Dec. 13, 1999

[87] PCT Pub. No.: WO99/08043

PCT Pub. Date: Feb. 18, 1999

[51] Int. Cl.[7] .................................................. H01R 33/02
[52] U.S. Cl. ............................................. 439/236; 363/260
[58] Field of Search ..................................... 439/227, 231, 439/236, 242, 243; 362/221, 315, 294; 363/260; 174/DIG. 2

[56] References Cited

U.S. PATENT DOCUMENTS

| | | | |
|---|---|---|---|
| 5,362,246 | 11/1994 | Lau | 439/231 |
| 5,428,515 | 6/1995 | Jung | 439/651 |
| 5,471,375 | 11/1995 | Lau | 262/260 |
| 6,059,593 | 5/2000 | Pastermak | 439/262 |

*Primary Examiner*—Brian Sircus
*Attorney, Agent, or Firm*—Maureen Stretch

[57] ABSTRACT

An adaptor having an adaptor base (10), shaped and dimensioned to fit over an R7s lampholder in such a way that contacts (06) in adaptor base (10) form electrical connections with contacts (03) in lampholder R7s, while boardholder (11) of adaptor base (10) is shaped and dimensioned to hold dimmable ballast (25) in electrical contact with contacts (06) of adaptor base (10).

11 Claims, 10 Drawing Sheets

ADAPTOR FOR USING A PLUG-IN TYPE COMPACT FLUORESCENT LAMP IN AN R7S LAMPHOLDER

This is a continuation of the following co-pending Chinese patent applications serial no. 97 2 34970.7, filed Jul. 7, 1997; application serial number 97 2 42818.6 filed Dec. 5, 1997; application serial number 97 2 42881.X, filed Dec. 11, 1997; application serial number 98 2 23882.7 filed Apr. 29, 1998; and application serial number 98 2 24088.0 filed May 25, 1998.

TECHNICAL FIELD

The present invention is generally related to adaptors for lampholders. More particularly, to adaptors for halogen-tungsten torchiere style fixtures using the R7s lampholder and to an apparatus for inserting compact fluorescent lamps (CFLs) in the R7s lampholder, instead.

BACKGROUND ART

Torchiere floor lamp fixtures such as that shown in FIG. 3, and similar fixtures manufactured to hold halogen-tungsten bulbs 80 with R7s lampholders in a bowl 50 have been discovered to pose significant fire hazards. The straight halogen-tungsten bulbs 80 for which such lamps were designed use significant energy (usually 300 or 500 Watts) and generate a significant amount of heat. When such lamps have been placed too close to draperies or other flammable materials the heat of the high—wattage halogen-tungsten bulbs has often been sufficient to cause the materials to catch fire. Similarly, when children or pets knock such lamps over onto flammable surfaces, fires have sometimes ignited. Not only do halogen-tungsten straight bulbs 80 of this type present a fire hazard and consume significant energy, they also do not have a long life. Usually such bulbs last only a thousand hours.

However, tens of millions of torchiere style floor lamp fixtures using this type of bulb have been sold around the world. The popularity of this type of fixture has made it difficult to use existing compact fluorescent bulbs as a replacement for several reasons. First, as seen in FIG. 3, the lampholder R7s for the straight halogen-tungsten bulbs 80 of this type of torchiere floor lamp fixture has two electrical contacts, R7s1 and R7s2 built into it. Existing compact fluorescent lamps (CFLs) were created to replace ordinary incandescent bulbs in standard tungsten incandescent lamps use E26, E27, B22 and other normal lampholders for conventional incandescent lamps. These usually consist of prongs connecting the fluorescent tube to a ballast which, in turn is fixed in a lampholder designed to screw into ordinary incandescent light fixtures. Consequently, the electrical connections in the lampholder R7s of torchiere-style fixtures do not fit those in existing CFL lamps and ballast replacement units.

Since compact fluorescent lamps require a ballast to operate, which adds to bulk and size, existing compact fluorescent products are also not shaped to fit in the form factor of a torchiere lamp bowl 50. Up to now there has been no compact fluorescent product to replace the straight halogen-tungsten bulb in existing torchiere style lamp fixtures.

Additionally, virtually all of the halogen-tungsten torchiere fixtures sold have a dimmer switch incorporated in them. Fitting a ballast for a compact fluorescent into the torchiere form factor is further complicated if the ballast also needs to be compatible with the common dimming switches used in halogen torchiere fixtures.

Also, modern compact fluorescents are designed to produce a more compact bulb with higher wattage. As the loads on the surface of the fluorescent tube increase, this causes the wall temperature of the compact fluorescent tube to increase. If wall temperature grows too high, the mercury vapor pressure in the tube, in turn, becomes very high which causes the overall light efficiency of the compact fluorescent to decrease. In conventional compact fluorescents, a cool point on the tube is created by structuring the appearance of the tube to include such a feature. However, this usually means the area of the cool point is small, and thus its cooling effect is limited. If such a tube is placed in a more confined area than the one for which it was designed, the cool point may not be sufficient to keep the mercury vapor pressure in the more optimal range. Thus, attempts to design a compact fluorescent adaptor for the torchiere style halogen-tungsten fixture encounter not only the problems of contact fit and form factor described above, but also the problems of heat dissipation and mercury vapor cooling problems.

It is an object of this invention to provide an adaptor for a halogen-tungsten lampholder in torchiere-style lighting fixtures which will allow a compact fluorescent lamp to be used in the fixture instead of the halogen-tungsten bulb.

DISCLOSURE OF INVENTION

To satisfy the above purpose, the subject invention comprises an adaptor having an adaptor base 10, shaped and dimensioned to fit over a lampholder R7s in such a way that contacts 06 in adaptor base 10 form electrical connections with contacts 03 in lampholder R7s, while boardholder 11 of adaptor base 10 is shaped and dimensioned to hold dimmable ballast 25, in electrical contact with contacts 06 of adaptor base 10. Adaptor cover 14 has opening 15a with a screw opening, and prongholders 15b positioned to hold compact fluorescent lamp 20's downwardly extending prongs into electrical contact with dimmable ballast board 25. In a preferred embodiment, dimmable ballast 25 fits inside well 11 of adaptor base 10 and adaptor cover 14 is shaped and dimensioned to fit over dimmable ballast 25 and onto adapter base 10 by pressure fit. Adaptor cover 14 also has grooves 17 to fit a standard 2D compact fluorescent lamp 20. Adaptor base 10 with dimmable ballast 25 and adaptor cover 14 are inserted over lampholder R7s and screwed onto lampholder R7s, thus forming a low profile compact fluorescent lamp adaptor for a halogen-tungsten torchiere style fixture. In a preferred embodiment, heat sink 12 is inserted into adaptor base 10 and prongs 22 are shaped and dimensioned to fit over the fluorescent tube of compact fluorescent lamp 20, thereby providing additional cooling for the tube of the compact fluorescent lamp 20.

BEST MODE FOR CARRYING OUT THE INVENTION

Figure 1:
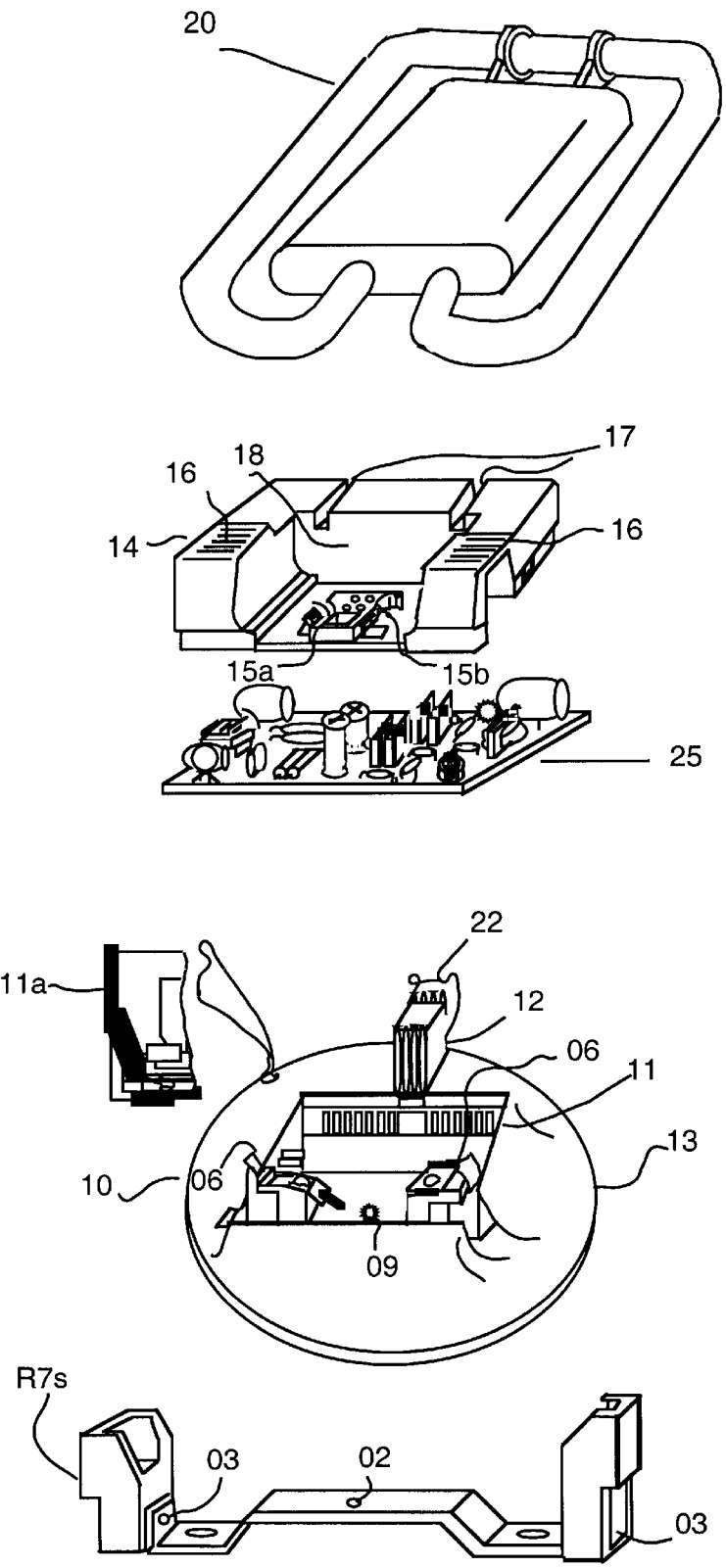
FIG. 1 is a perspective drawing showing an exploded view of one preferred embodiment of the present invention.

In FIG. 1, an exploded perspective view of the present invention is shown. A conventional R7s lampholder of a torchiere style fixture is shown with contacts 03, which are connected to the wiring inside the lamp base. R7s lampholder also includes an aperture 02, through which a screw can be inserted to hold a lamp in place. In a preferred embodiment of the present invention, adaptor base 10 is formed with a generally rounded skirt 13 which is shaped to fit into the bowl 50 of a torchiere style lamp. Adaptor 10 is also shaped and dimensioned to contain a boardholder 11 which is an open area shaped to contain a printed circuit board such as dimmable ballast board 25 in electrical contact with contacts 06 of adaptor base 10. In a preferred embodiment, adaptor base 10 also includes heat sink 12, with prongs 22, to dissipate heat and provide a cool spot and act as a side holder for a compact fluorescent bulb 20. In a preferred embodiment, a dimmable ballast board 25 is inserted by simple pressure fit into adaptor base 10 and held in electrical contact with electrical contacts 06. Dimmable ballast board 25 is also inserted into boardholder 11 and locked in place by tab 11a in such a way as not to obstruct screw opening 09 in adaptor base 10. Also in a preferred embodiment, adaptor base 10 is formed of injection molded plastic of the PCB type.

Still in FIG. 1, adaptor cover 14 of the present invention, also made of injection molded plastic, is shaped and dimensioned to provide a pressure fit cover over adaptor base 10. Adaptor cover 14 has screw well 15a through which a screw can be inserted to hold adaptor cover 14 firmly onto adaptor base 10 and in turn onto aperture 02 of lampholder R7s of the torchiere style fixture. Those skilled in the art will appreciate that other methods of fastening the parts together could be used, such as nails, or clips or other fasteners.

Remaining in FIG. 1, it can be seen that adaptor cover 14 also has prongholders 15b which are shaped to hold the downwardly extending prongs of a compact fluorescent bulb 20 (not shown in this view) in electrical contact with dimmable ballast board 25. Adaptor cover 14 also has vents 16 along a portion of its top surface to provide additional heat dissipation. In one preferred embodiment, adaptor cover 14 is also shaped to have groves 17 and a central depression 18 to hold a standard 2D compact fluorescent lamp 20.

Figure 9:
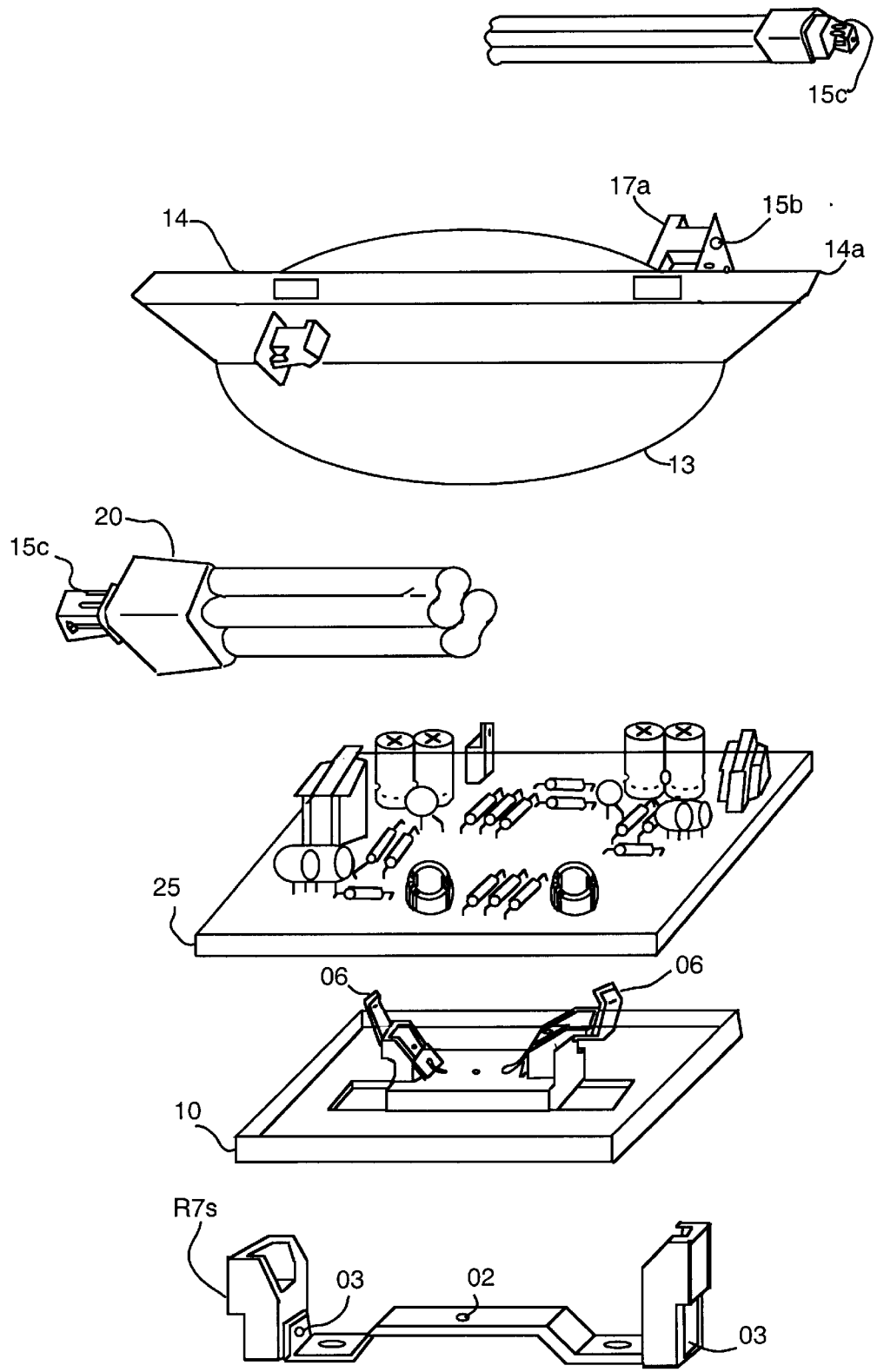
FIG. 9 is an exploded view of an alternative preferred embodiment of the invention showing an adaptor shaped to hold two compact fluorescents.

Turing briefly to FIG. 9, an alternative preferred embodiment is shown for a two-lamp adaptor. Here, adaptor base 10 is rectangularly shaped and fits over a lampholder R7s. A dimmable ballast board 25 is inserted into adaptor base 10, and covered by adaptor cover 14, which in this embodiment is shaped with a generally rounded skirt 13. Adaptor cover 14 in this preferred embodiment can be made of metal or plastic, and is shaped with a ridged area 14a to which sockets 17a are affixed. Sockets 17a have prongholders 15b to hold the outwardly extending prongs 15c of compact fluorescent lamps 20 in electrical contact with the dimmable ballast board 25, through wires or metal contacts connecting sockets 17a to dimmable ballast board 25. The potential advantage of this alternative preferred embodiment for two lamps is that a higher wattage, higher light output configuration of compact fluorescent lamps can be used to retrofit the tungsten-halogen torchiere style fixture.

Figure 2B:
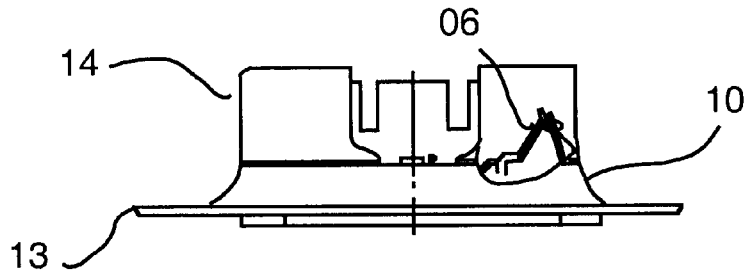
FIG. 2b is a side view of adaptor cover 14 of the invention.
Figure 2A:
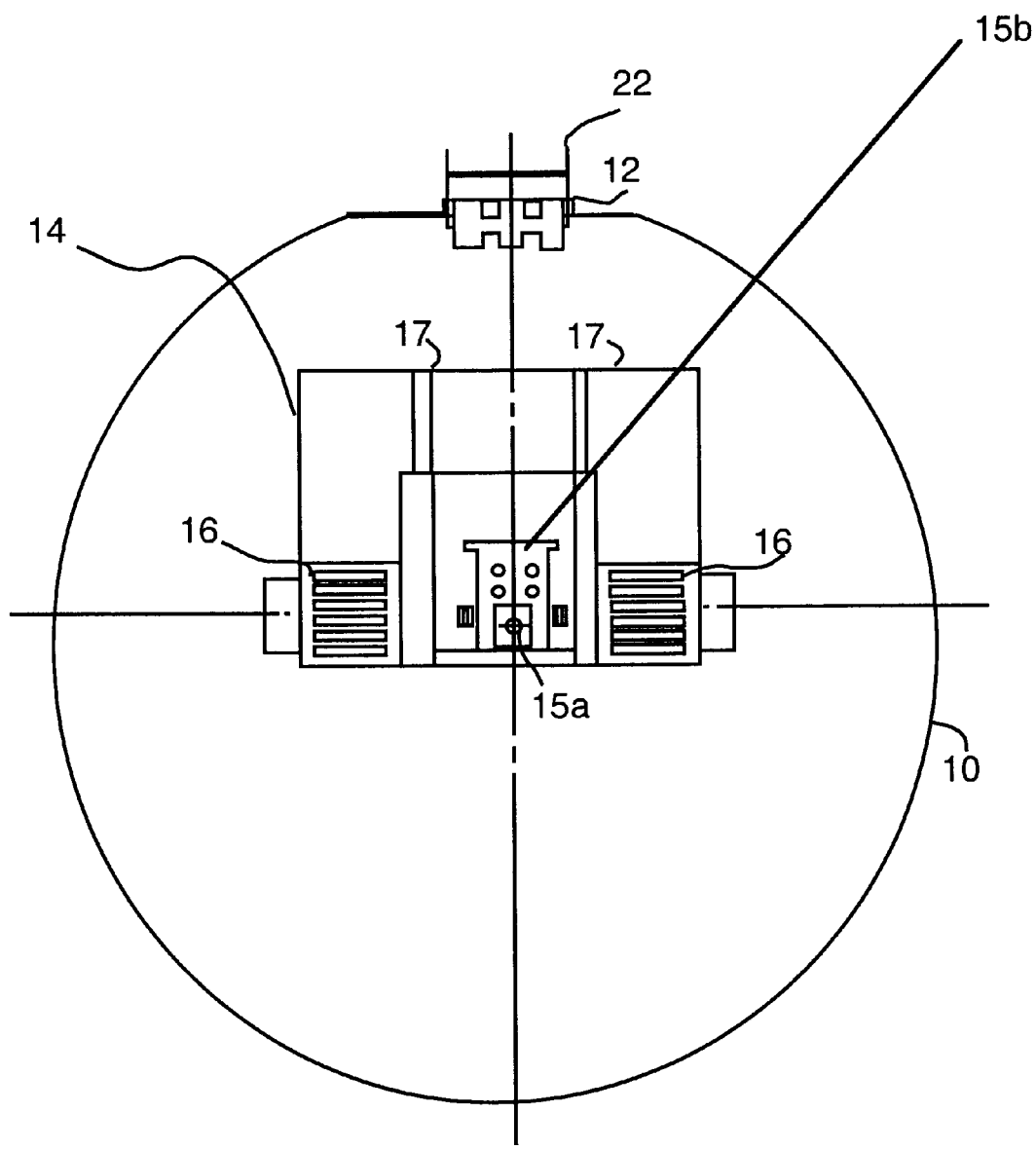
FIG. 2a is a top view of one implementation of adaptor cover 14 of the invention.
Figure 3:
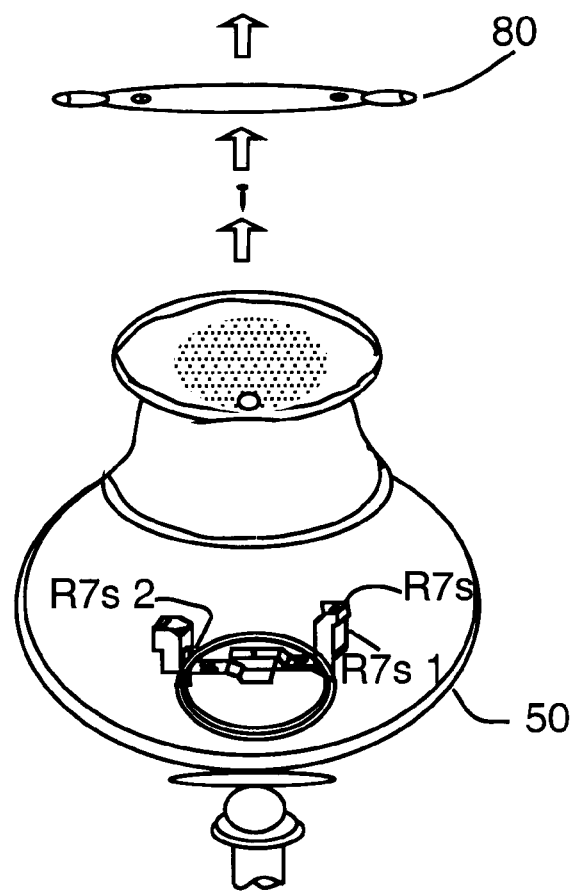
FIG. 3 is a perspective view of a conventional tungsten-halogen lamp fixture.

Now turning to FIG. 2a, a top view of the adaptor of the first preferred embodiment of the present invention is shown. Here, adaptor cover 14 is shown in place on top of adaptor base 10. In this preferred embodiment, adaptor base 10 has a generally concave, rounded skirt 13. As can be seen here, adaptor cover 14 fits over adaptor base 10 and includes screw well 15a and prongholders 15b. In a preferred embodiment, a standard 2D compact fluorescent, such as those manufactured by General Electric Corporation can be inserted into prongholders 15b and fit into groves 17. In this top view of adaptor cover 14, vents 16 can be seen more clearly as openings which allow heat generated by dimmable ballast board 15 inside the adaptor to be dissipated. Also in this view, heat sink 12, with its prongs 22 is shown.

Turning now to FIG. 2b, a side view of the adaptor of the first preferred embodiment is shown, with adaptor cover 14 fitted on top of adaptor base 10. The profile formed by the complete adaptor is a very low one which is designed to fit unobtrusively inside the bowl 50 of a torchiere-style fixture. A cutaway view in FIG. 2b of adaptor cover 14 shows contacts 06 inside which permit dimmable ballast board 25 inside to be held in electrical contact with a lampholder R7s. Note in this view that skirt 13 of adaptor base 10 is not only generally rounded, but slopes down from adaptor cover 14, forming a generally concave unit. In a preferred embodiment, skirt 13 is also made of a reflective material or finish, to reflect light from compact fluorescent 20 up and away from skirt 13. Also, those skilled in the art will appreciate that while adaptor cover 14 is pressure fit to adaptor base 10 in a preferred embodiment, it could also be fastened in other ways, such as by additional screws or clips or clamps. Alternatively, the adaptor of the present invention could also be made of one piece, such that adaptor base 10 and adaptor cover 14 are formed as one piece to hold dimmable ballast board 15 in contact with a lampholder R7s.

Figure 4:
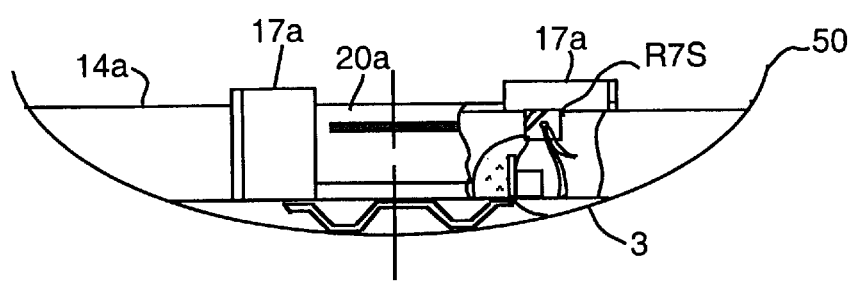
FIG. 4 is a cutaway side view of an alternative preferred embodiment of the present invention.

With reference now to FIG. 4, a cutaway side view of the alternative preferred embodiment for a two lamp adaptor is shown. In this view, the ridged area 14a can be seen sitting well below the lip of bowl 50 of the torchiere style fixture. Each socket 17a holds one compact fluorescent lamp 20 in the same plane as ridged area 14, so that the compact fluorescent lamps 20 do not obtrude above the lip of bowl 50 either. In this alternative preferred embodiment, skirt 13 and adaptor cover 14 can be made of metal or plastic, since the structure shields the electronics from contact with the metal.

Figure 5:
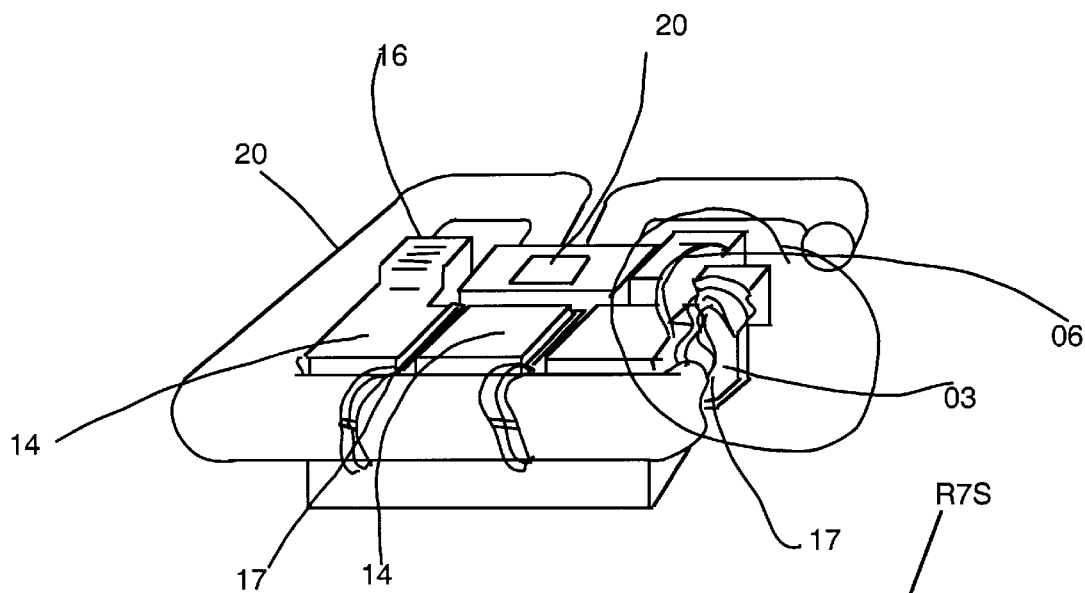
FIG. 5 is a perspective view of a standard 2D compact fluorescent lamp fitted onto an adaptor of the present invention.

Turning now to FIG. 5, a single standard 2D compact fluorescent lamp 20 is shown fitted into adaptor cover 14 of the present invention according to the first preferred embodiment. As can be seen, groves 17 in adaptor cover 14 hold portions of compact fluorescent lamp 20 in place, while those parts of adaptor cover 14 which contain vents 16 are above the level of the tubes of compact fluorescent lamp 20.

Figure 6:
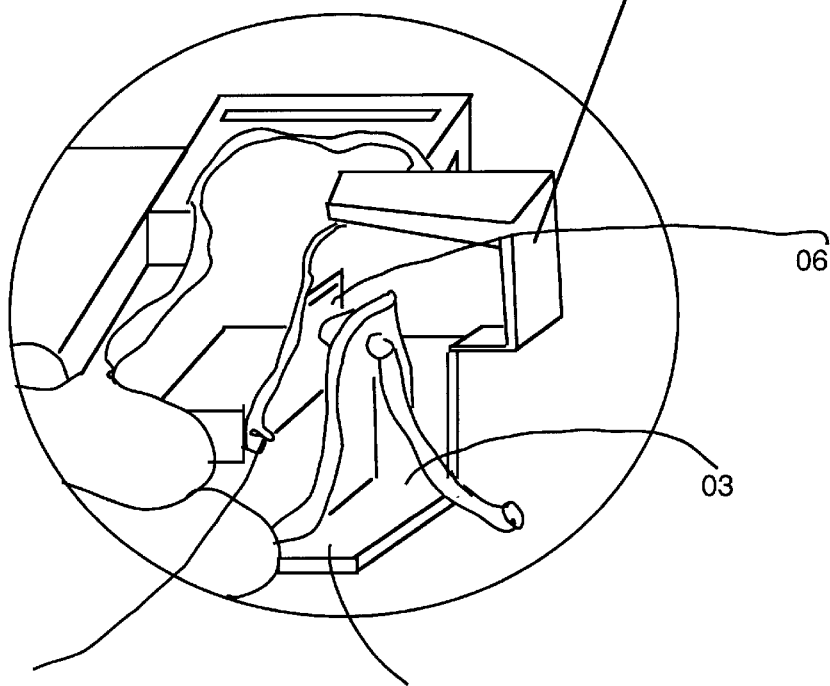
FIG. 6 is an enlarged perspective view of the contact fitting of the present invention.

Now with reference to FIG. 6, a cutaway perspective view of the contacts 06 of adaptor base 10 the present invention can be seen in electrical contact with contacts 03 of the lampholder R7s of a torchiere-style fixture.

Figure 7:
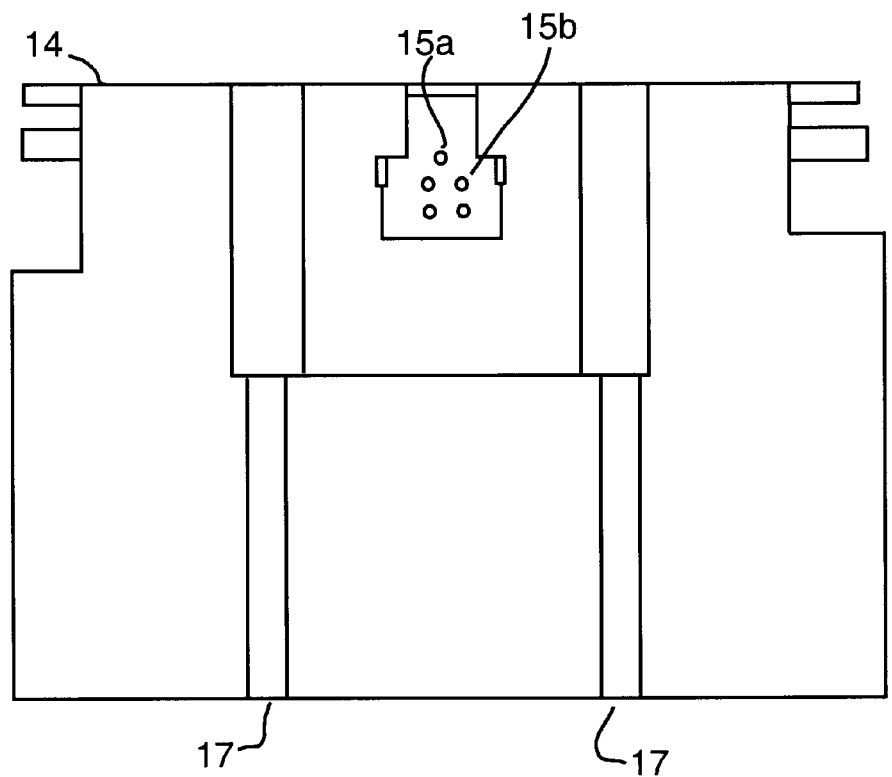
FIG. 7 is a top view of an alternative preferred embodiment of adaptor cover 14.

In FIG. 7, a top view of adaptor cover 14 is shown, revealing screw well 15a and prongholders 15b, as well as grooves 17.

Figure 8C:
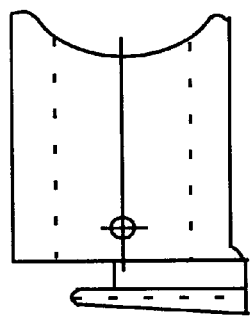
FIG. 8a is an exploded view of the present invention, with FIGS. 8b a top view, 8c a side view and 8d another side view.
Figure 8D:
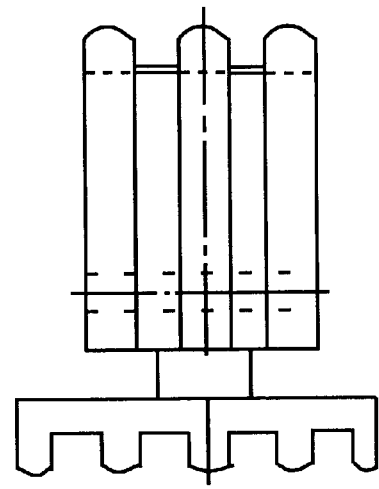
Figure 8B:
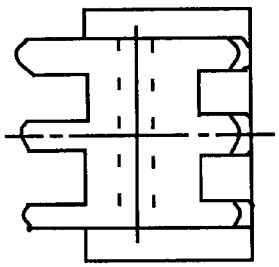
Figure 8A:
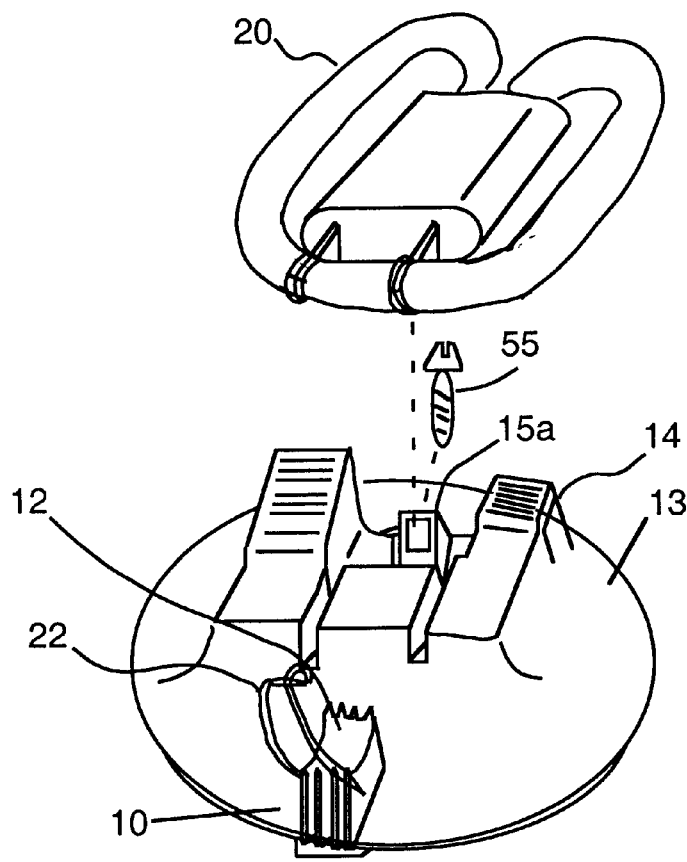

Turning now to FIG. 8a, an exploded view of another alternative preferred embodiment of the present invention is shown in which adaptor base 10 and adaptor cover 14 are formed as one unit with a heat sink 12. Prongs 22 on heat sink 12, fit over the tube of compact fluorescent lamp 20 and form a cool spot to dissipate heat and aid in controlling the cooling of the mercury vapor inside the tube, as well as in holding the tube. In a preferred embodiment, heat sink 12 is in contact with the bowl 50 of the torchiere style fixture, to dissipate the heat into the bowl 50.

Figure 10:
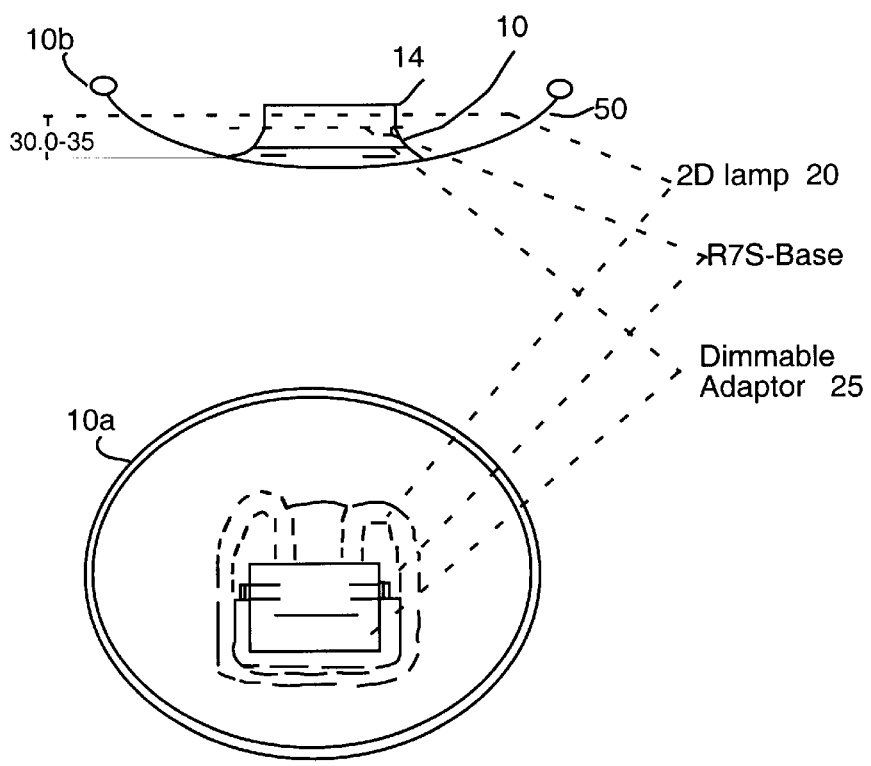
FIG. 10 shows two schematic views, 10a and 10b of a compact fluorescent lamp mounted in a torchiere bowl using the present invention.

With reference now to FIG. 10, a top view 10a and a side view 10b of an adaptor of the present invention, fitted with a 2D compact fluorescent lamp 20 is shown fitted inside the bowl 50 of a torchiere-style lamp. As can be seen in view 10b even with compact fluorescent lamp 20 fitted on top of adaptor cover 14 which is, in turn fitted onto adaptor base 10, the profile of the replacement lamp does not protrude above the lip of the bowl 50 of the torchiere-style fixture.

Figure 11:
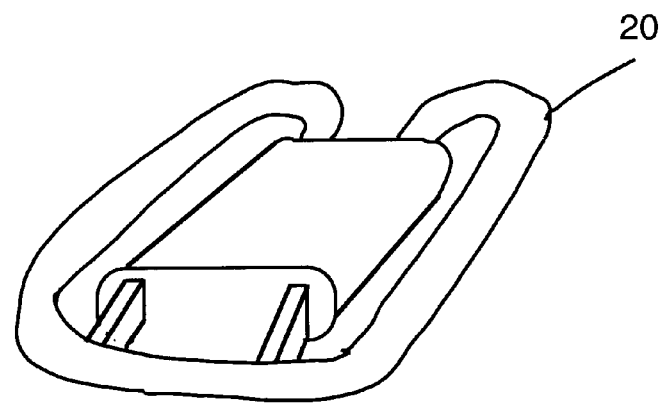
FIG. 11 is an exploded view of the present invention showing the mounting features.
Figure 11:
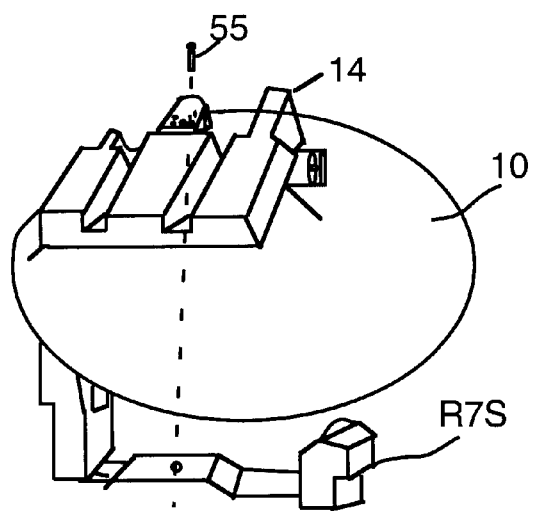

Now referring to FIG. 11, in another exploded view of the adaptor of the present invention, screw 55 is shown in relation to compact fluorescent lamp 20, adaptor cover 14, adaptor base 10 and lampholder R7s. As can be seen here, compact fluorescent lamp 20 is pressure fit into adaptor cover 14, which in turn, is pressure fit to adaptor base 10. Screw 55 holds the completed adaptor onto lampholder R7s.

In a preferred embodiment, the skirts 13 of the adaptor bases 10 of the present invention are made of light colored or reflective materials to reflect the light generated by the compact fluorescent lamps up out of the bowl of the torchiere-style lamp fixture.

Industrial Applicability

By using this utility model invention, a variety of the torchiere style light fixtures which were originally sold with the R7s lamp lampholder and tungsten-halogen lamps can now be retrofitted with standard compact fluorescent lamps. This not only greatly reduces the fire hazards posed by the original tungsten-halogen bulbs, but also provides significant energy savings without detracting from the aesthetic design of the torchiere style fixtures.

What is claimed is:

1. An adaptor for a torchiere-style tungsten halogen lamp fixture having a bowl containing an R7s lampholder with two electrical contacts, comprising:

an adaptor base having two electrical contacts, the adaptor base being shaped and dimensioned to fit an R7s lampholder such that said electrical contacts in said adaptor base form electrical connections with electrical contacts in said R7s base, said adaptor base also being shaped and dimensioned to form a boardholder;

a ballast printed circuit board shaped and dimensioned to fit inside said boardholder of said adaptor base in such a way as to form electrical connection when wired with said electrical contacts in said adaptor base;

an adaptor cover shaped and dimensioned with an upper surface grooved to hold at least one compact fluorescent lamp and an under surface shaped and dimensioned to fit over the boardholder of said adaptor base in such a way that said compact fluorescent lamp is held in electrical connection with said ballast printed circuit board, forming a complete electrical circuit which allows said compact fluorescent lamp to be used in place of a tungsten-halogen lamp in said fixture without protruding above the lip of said bowl of said fixture.

2. The apparatus of claim 1, wherein said adaptor cover is shaped and dimensioned to hold two compact fluorescent lamps.

3. The apparatus of claim 1, wherein said adaptor base further includes a heat sink held in electrical contact with said bowl to dissipate heat.

4. The apparatus of claim 3, wherein said heat sink further comprises prongs shaped and dimensioned to fit over the tube of said compact fluorescent lamp, for forming a cool spot to dissipate heat and control mercury vapor pressure in said compact fluorescent lamp.

5. The apparatus of claim 1, wherein said adaptor further includes a generally concave, skirt shaped area which fits inside said bowl and serves as a reflector.

6. The apparatus of claim 1, wherein said ballast printed circuit board further comprises a dimmable ballast printed circuit board.

7. The apparatus of claim 1, wherein said adaptor base includes a screw aperture through which a screw may be inserted.

8. The apparatus of claim 7, wherein said adaptor cover includes a screw well positioned to fit over said screw aperture in said adaptor base, so that a screw inserted therethrough will hold both said adaptor cover and said adaptor base to said R7s base.

9. The apparatus of claim 1, wherein said adaptor cover further comprises prongholder apertures through which prongs of a compact fluorescent lamp can be inserted to bring said compact fluorescent lamp into electrical contact with said ballast printed circuit board.

10. The apparatus of claim 1, wherein said adaptor cover further comprises at least one top surface area having vent openings therethrough to provide heat dissipation.

11. An adaptor for a torchiere-style tungsten halogen lamp fixture having a bowl containing an R7s lampholder with two electrical contacts, comprising:

an adaptor base having two electrical contacts, the adaptor base being shaped and dimensioned to fit an R7s lampholder such that said electrical contacts in said adaptor base form electrical connections with electrical contacts in said R7s base, said adaptor base also being shaped and dimensioned to form a boardholder and to include a heat sink having prongs;

a dimmable ballast printed circuit board shaped and dimensioned to fit inside said boardholder of said adaptor base in such a way as to form electrical connection when wired with said electrical contacts in said adaptor base;

an adaptor cover shaped and dimensioned with an upper surface grooved to hold at least one compact fluorescent lamp, said upper surface also containing a screw well and at least one vent opening, and said adaptor cover also having an under surface shaped and dimensioned to fit over the boardholder of said adaptor base in such a way that said compact fluorescent lamp is held in electrical connection with said dimmable ballast printed circuit board, forming a complete electrical circuit which allows said compact fluorescent lamp to be used in place of a tungsten-halogen lamp in said fixture without protruding above the lip of said bowl of said fixture.

* * * * *